United States Patent [19]

Bailey

[11] 4,080,705
[45] Mar. 28, 1978

[54] METHOD FOR REPAIRING WHEEL HUBS FOR VEHICLES

[76] Inventor: Ronald G. Bailey, Rte. 3, Box 81, Jacksonville, Ark. 72076

[21] Appl. No.: 800,987

[22] Filed: May 26, 1977

[51] Int. Cl.² ............................ B21K 1/40; B23P 7/00
[52] U.S. Cl. ................................ 29/159.3; 29/401 R; 29/407
[58] Field of Search .................. 29/159.3, 401 R, 407, 29/159 R

[56] References Cited

U.S. PATENT DOCUMENTS

| | | | |
|---|---|---|---|
| 2,781,231 | 2/1957 | Black | 29/159.3 |
| 3,740,820 | 6/1973 | Tarves, Jr. | 29/401 |

*Primary Examiner*—Victor A. DiPalma
*Attorney, Agent, or Firm*—Joseph E. Rusz; Richard J. Killoren

[57] ABSTRACT

A method of repairing hubs for vehicles having full floating axles wherein the hubs are damaged by having at least one excessively elongated stud bolt hole. A template having a plurality of holes positioned to match the stud bolt holes and additional holes positioned midway between the stud-bolt-hole matching holes is secured to the hub flange, by means of studs on the flange passing through the additional holes. With the stud-bolt-hole matching holes as a guide, new holes are drilled in the flange. The new holes are then tapped and new studs are inserted in the new holes.

1 Claim, 5 Drawing Figures

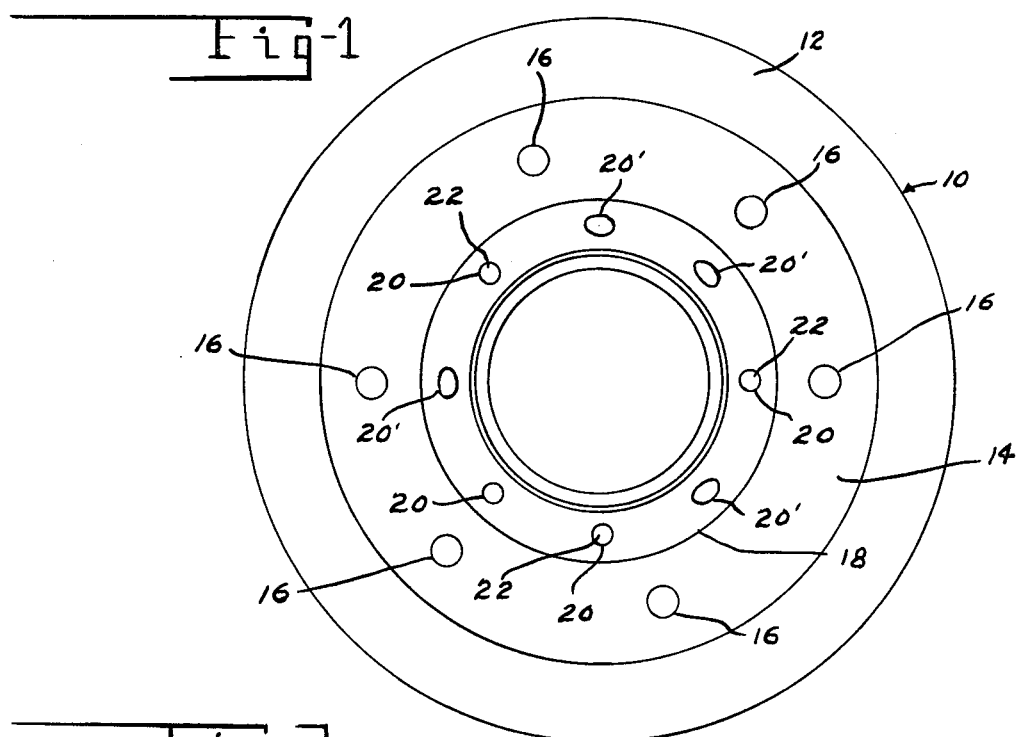
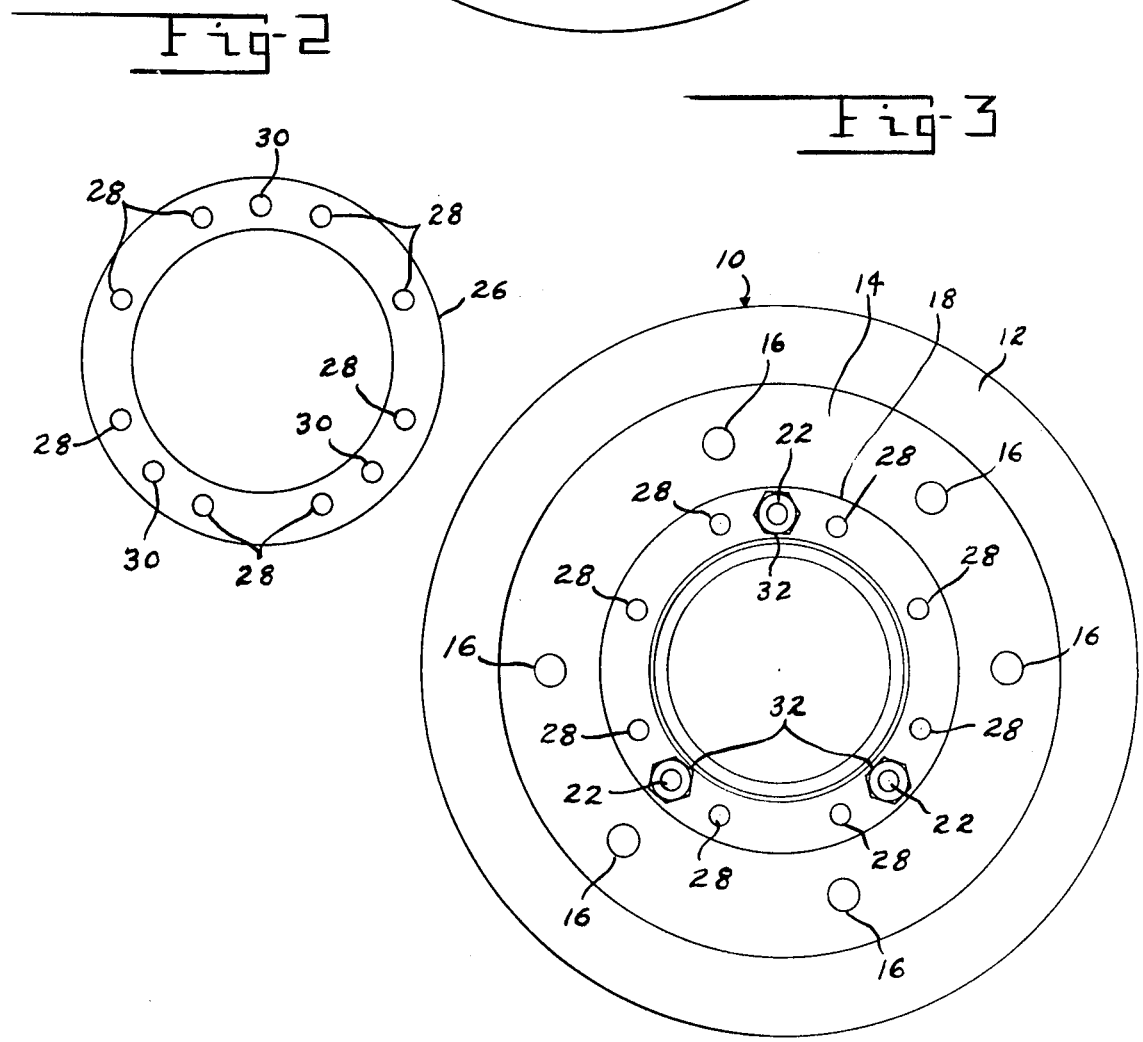

METHOD FOR REPAIRING WHEEL HUBS FOR VEHICLES

RIGHTS OF THE GOVERNMENT

The invention described herein may be manufactured and used by or for the Government of the United States for all governmental purposes without the payment of any royalty.

BACKGROUND OF THE INVENTION

This invention relates to a method for repairing wheel hubs for vehicles having full floating axle systems.

Vehicles, such as a fork lift, having full floating axle systems have threaded studs on a flange for securing the hub to the axle. The holes for the studs sometimes become elongated from wear. If new studs are installed in the elongated holes, the studs are not held rigidly and will soon break. Redrilling and retapping the holes with the studs replaced with oversized studs is possible if the elongation is not too great. In the past if the elongation was too great the hubs were replaced. This sometimes resulted in the vehicle being out of service for several months until new parts could be obtained.

BRIEF SUMMARY OF THE INVENTION

According to this invention, a method is provided for repairing damaged wheel hubs which permits the vehicle to be placed in service and also increases the life of the hubs.

A template, having holes corresponding to the stud holes on the hub flange and additional holes equally spaced between pairs of stud hole matching holes, is secured to the hub. With the template as a guide new holes are drilled in the hub flange, midway between the existing stud holes. New studs are then threaded into the new holes. The hub can then be secured to the axle in the conventional manner.

IN THE DRAWINGS

FIG. 1 shows a conventional wheel hub for vehicles with full floating axles.

FIG. 2 shows a template for use in the repair of the hub of FIG. 1.

FIG. 3 shows the hub of FIG. 1 with the template attached.

Figure 4:
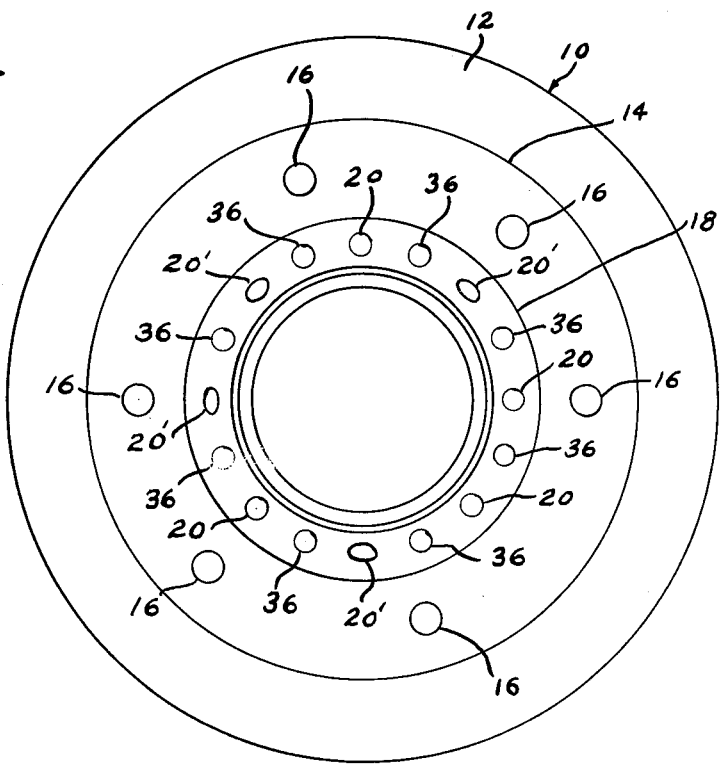
FIG. 4 shows the hub of FIG. 1 after new holes are drilled in the axle engaging flange.

Reference is now made to FIG. 1 of the drawing which shows a hub 10 for a forklift truck. The hub has a brake drum 12, a wheel mounting flange 14 with wheel mounting studs 16 and an axle mounting flange 18 with holes 20 for securing axle mounting studs. Damaged holes are indicated at 20'. The studs are removed from all of the holes except two or more of the least damaged holes, here shown as three studs indicated at 22.

A template 26 is made with holes 28 corresponding to each of holes 20 on flange 18 and with a plurality of holes 30 midway between pairs of holes 28. Here three holes 30 are shown corresponding to the positions of studs 22. However, additional holes would normally be provided to permit more latitude in the selection of the positions of studs 22 to be used to secure the template to the flange. The template is secured to the flange by means of nuts 32 as shown in FIG. 3.

Figure 5:
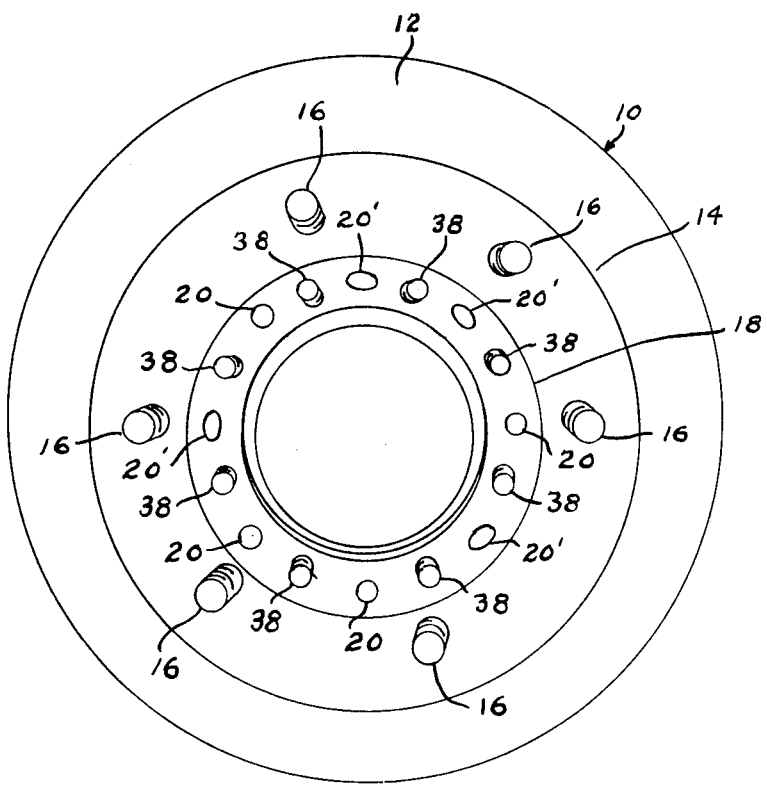
FIG. 5 is an isometric view showing the hub of FIG. 4 with the new studs in place.

With the template as a guide, new holes are then drilled in the flange 18 at the position of each of the holes 28. The new holes are drilled to the same size as holes 20. The template is then removed and the new holes 36, as shown in FIG. 4, are tapped and new studs 38 are inserted in each of the tapped holes as shown in FIG. 5. The hub is then ready for assembly in the conventional manner.

There is thus provided a method for repairing a hub for a vehicle with a full floating axle which will permit a return to service of the vehicle while awaiting new parts and which will increase the life of the hub.

I claim:

1. The method for repairing a damaged wheel hub having at least one excessively elongated stub bolt hole in the axle engaging flange, comprising: providing a template having a plurality of first holes positioned to match the stud bolt holes on the flange and a plurality of second holes equally spaced between pairs of said first holes; placing the template on the flange with flange stud bolts passing through at least two of said second holes in the template; securing the template to the flange with the first holes on the template equally spaced between pairs of stud bolt holes; drilling a plurality of additional holes in the hub flange with each of the first holes in the template used as a guide; removing the template from the hub; tapping the new stud bolt holes; installing axle engaging studs in said new holes in the hub.

* * * * *